Figure 1:
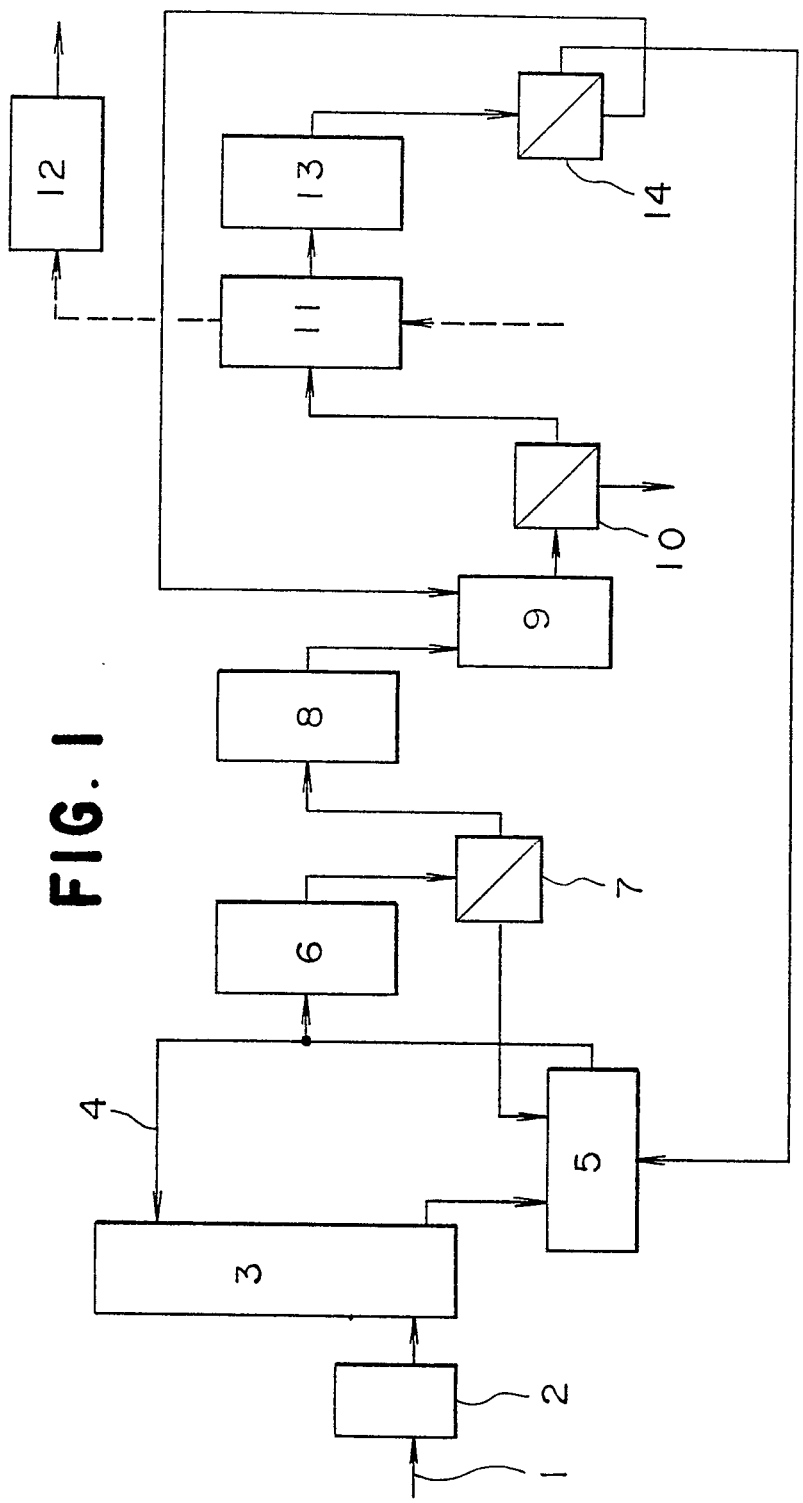

United States Patent [19]

Nomoto et al.

[11] 4,255,401

[45] Mar. 10, 1981

[54] TREATMENT OF EXHAUST GAS CONTAINING SULFUR OXIDES AND NITROGEN OXIDES

[75] Inventors: Kohki Nomoto; Yoshihiko Kudo, both of Iwaki, Japan

[73] Assignee: Kureha Kagaku Kogyo Kabushiki Kaisha, Tokyo, Japan

[21] Appl. No.: 957,441

[22] Filed: Nov. 3, 1978

[30] Foreign Application Priority Data

Nov. 11, 1977 [JP] Japan ................................. 52-135836

[51] Int. Cl.$^2$ ............................................. B01D 53/34
[52] U.S. Cl. ..................................... 423/235; 423/242
[58] Field of Search ........................ 423/235, 242, 351

[56] References Cited

U.S. PATENT DOCUMENTS

| | | |
|---|---|---|
| 3,991,161 | 11/1976 | Saitoh et al. ......................... 423/235 |
| 3,992,508 | 11/1976 | Saitoh et al. ......................... 423/235 |
| 4,044,101 | 8/1977 | Hisamatsu et al. ................... 423/235 |
| 4,079,118 | 3/1978 | Gorai .................................... 423/235 |

*Primary Examiner*—G. O. Peters
*Attorney, Agent, or Firm*—Stevens, Davis, Miller & Mosher

[57] ABSTRACT

A method of treating an exhaust gas at a high temperature containing nitrogen oxides and sulfur oxides by bringing the exhaust gas into contact with an absorbing solution containing at least an iron chelate salt and potassium sulfite to thereby convert said nitrogen oxides and sulfur oxides into a mixture of potassium imidodisulfonate, potassium dithionate and potassium sulfate, characterized in that (1) the exhaust gas at a high temperature is cooled to a temperature below 80° C. before bringing it into contact with the absorbing solution, (2) the concentration of potassium sulfite as the sulfite component in the absorbing solution is kept at least at 0.8 mol/kg, and (3) the mixture of salts produced in the absorbing solution is crystallized by cooling and separated by filtering the absorbing solution.

4 Claims, 2 Drawing Figures

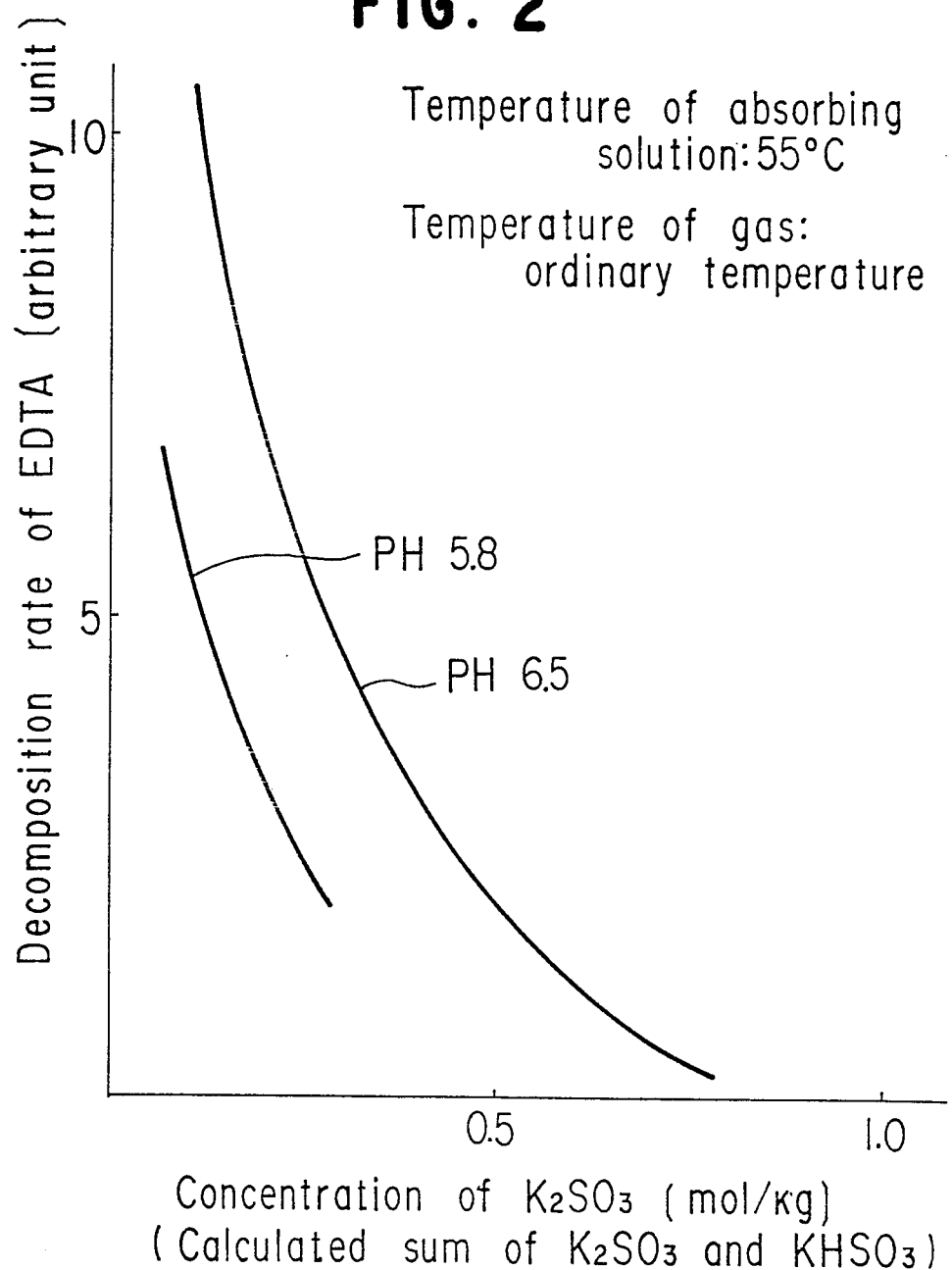

TREATMENT OF EXHAUST GAS CONTAINING SULFUR OXIDES AND NITROGEN OXIDES

The present invention relates to a process for treatment of exhaust gas containing nitrogen oxides (hereinafter referred to as NOx) and sulfur oxides (hereinafter referred to as SOx), and more particularly, it relates to such an exhaust gas treating process in which NOx and SOx in exhaust gas are absorbed in an aqueous solution containing at least an ferrous chelate salt and potassium sulfite and the resultant generated potassium imidodisulfonate, potassium dithionate, potassium sulfate, in the aqueous solution are crystallized, separated and then converted into gaseous nitrogen and hydrogen sulfide or sulfur.

As means for simultaneous removal of NOx and SOx in exhaust gas, there have been proposed the methods in which both NOx and SOx are absorbed in an aqueous solution containing a ferrous chelate salt and an alkali sulfite, and fixed as a mixture of imidodisulfonate, dithionate and sulfate (Japanese Patent Laid-Open No. 108682/76 and, No. 125670/76, etc.). These methods, however, are not yet practiced on an industrial scale as far as the present inventors know. This is considered to be attributable to the following reasons:

Firstly, the fact has been found that an unexpectedly high degree of loss of the chelating agent such as ethylenediaminetetraacetate (EDTA) is caused by its own decomposition when these methods are applied actually for treatment of industrial waste gas. As is well known, the chelating agents are very expensive, and it is presumed that the expenditure for compensating such a loss can amount to almost half of the total running cost.

Secondarily, it is very difficult to effectively separate and remove the entirety of the thus produced salt mixture from the absorbing solution. For instance, in case of using sodium sulfite as the alkali sulfite component of the absorbing solution the sodium imidodisulfonate which has high solubility does not crystallize even when the absorbing solution is cooled, and instead the sodium Fe (III) chelate salt having low solubility crystallizes out. Also, in case of using ammonium sulfite as the alkali sulfite component of the absorbing solution, ammonium dithionate does not crystallize, and in case of using magnesium sulfite, the concentration of sulfite can not be raised. Thus, the undesirable loss of the chelating agent is hardly avoidable in this case, too. Needless to say, it is an essential requirement for effective practice of this kind of waste gas treating system on an industrial scale that the whole of the product in the absorbing solution be effectively recovered and then converted into a form suitable for recycling in the system.

The third reason, therefore, is that the problem of such effective recycling has remained unsolved in the prior art.

An object of this invention, therefore, is to provide an exhaust gas treating process according to which the loss of the chelating agent such as EDTA due to its decomposition and crystallization in the absorbing solution is minimized.

Another object of the present invention is to provide such an exhaust gas treating process which is capable of effectively separating and recovering the afore-mentioned whole product (salt mixture) from the absorbing solution.

Still another object of this invention is to provide an effective recycling system adaptable in exhaust gas treatment for converting the afore-mentioned recovered salt mixture into a suitable form for reuse.

Other objects and advantages of the present invention will fuether become apparent hereafter and in the drawings in which:

FIG. 1 is a flow sheet illustrating a preferred embodiment of this invention, and FIG. 2 is a graphic illustration of the relationship between the concentration of potassium sulfite (In this case a portion of the added potassium sulfite changes to potassium hydrogen sulfite in the absorbing solution, and the concentration of potassium sulfite illustrated herein is the calculated sum of the concentration of potassium sulfite and that of potassium hydrogen sulfite. The words "the concentration of potassium sulfite in the absorbing salution" which appears hereinafter is to be taken as mentioned above.) and the rate of decomposition of EDTA as determined from the inventors' experiments.

Referring to FIG. 1, an exhaust gas 1 at a high temperature containing $NO_x$ and $SO_x$ is at first supplied into a cooling tower 2 for cooling to a temperature below 80° C. and then led into an absorption tower 3. The exhaust gas at a high temperature 1 is usually maintained at higher temperature, at lowest 120° C., for avoiding corrosion of the heat exchanger, so that it is a decisively important condition in the present invention to cool such exhaust gas to a temperature of lower than 80° C. before introducing it into the absorption tower 3. Incorporation of such a cooling step in the process of the present invention is based on the inventors' finding that there takes place a rapid decomposition of the chelating agent when the temperature of the exhaust gas brought into contact with the absorbing solution is over 80° C. The exhaust gas introduced into the absorption tower 3 after cooling is brought into contact with an absorbing solution which is supplied into the absorption tower 3 through a pipe 4 for inducing a reaction for absorbing NOx and SOx in exhaust gas into the absorbing solution. As the chelating agent which is to be present in the absorbing solution, an aminopolycarboxylic acid such as ethylenediaminetetraacetic acid and nitrilotriacetic acid is used in an amount of 0.1–0.5 mol/kg, preferably 0.2–0.4 mol/kg.

According to another feature of the present invention, the concentration of potassium sulfite in the absorbing solution should be at least 0.8–1.6 mol/kg, preferably 0.8–1.2 mol/kg. As is seen from the experimental data of FIG. 2, the decomposition rate of the chelating agent such as EDTA is strongly dependent on the concentration of potassium sulfite, and it has been found that the decomposition of the chelating agent can be very effectively prevented when the concentration of potassium sulfite is raised.

The decomposition of the chelating agent such as EDTA is also influenced by the temperature of absorbing solution, and hence, for example, when EDTA is used as the chelating agent, it needs to maintain the temperature of absorbing solution below 60° C. It is to be noted, however, that the temperature of solution is usually kept higher than about 40° C. so as to prevent undesirable precipitation of the salts.

The solution which has absorbed NOx and SOx in the absorption tower 3 is circulated back to the absorption tower 3 through a circulation tank 5 but a part of the solution is passed into a crystallizer 6 and cooled to 30° to 35° C. In the crystallizer 6, potassium imidodisulfonate, potassium sulfate and potasssium dithionate in the solution crystallize with the absorption product and separated in a filtering separator 7. The filtrate is returned to the circulation tank 5.

Thus, as a result of use of potassium, instead of generally used sodium, as the alkali component of the absorbing solution in the present invention, there has come out a favorable result that all the salts produced, including imidodisulfonate, very easily crystallize while the iron-chelate salts does never crystallize.

The separated potassium salts are subjected to a thermal decomposition and reduction in a furnace 8. These reactions may be expressed by the following formulae.

Thermal decomposition:
$$NH(SO_3K)_2 \rightarrow K_2SO_4 + SO_2 + \tfrac{1}{3}N_2 + \tfrac{2}{3}NH_3$$
$$K_2S_2O_6 \rightarrow K_2SO_4 + SO_2$$
Reduction:
$$K_2SO_4 + 4C \rightarrow K_2S + 4CO$$
$$K_2SO_4 + 2C \rightarrow K_2S + 2CO_2$$
$$K_2SO_4 + 2C \rightarrow K_2CO_3 + CO + S$$

The thermal decomposition is performed at 450°–550° C. for $NH(SO_3K)_2$ and at 200°–300° C. for $K_2S_2O_6$. At least a part of the gaseous sulfur dioxide produced in the thermal decomposition is mixed with the exhaust gas as a $SO_3^{2-}$ source for keeping constant the $K_2SO_3$ concentration in the absorbing solution, which is returned to the absorption tower. Then potassium sulfate produced by the above mentioned thermal decomposition is converted into potassium sulfide by the reduction. This reduction is accomplished by mixing a carbonaceous material such as coal, coke, petroleum pitch, petroleum coke or the like as the reducing agent. In case of using corbon as the reducing agent, potassium sulfate is converted mostly into potassium sulfide and about 10 mol% of potassium carbonate when the reaction temperature is above 900° C., but the conversion rate of the sulfate to the carbonate is raised up to about 40 mol% when the reaction temperature is 800° to 900° C. The rate of formation of potassium carbonate can be further raised by using a gaseous reductant.

These thermal decomposition and reduction may be carried out in a successive way, but it is more practical to lead both reactions simultaneously in a same furnace. The gas containing ammonia, carbon monoxide and other substances produced as a result of the above-mentioned reactions is burned to convert ammonia into nitrogen gas and carbon monoxide into carbon dioxide and then sent into the absorption tower in admixture with the exhaust gas 1.

Potassium sulfide and potassium carbonate produced from the above-mentioned thermal decomposition and reduction are dissolved in water to form an aqueous solution in a dissolving tank 9 and this solution is led into a separator 10 where the insolubles originating from the reducing agent are separated. The solution is further carried into a hydrogen sulfide dissipation tower 11 where gaseous carbon dioxide ($CO_2$) is blown into the solution to form hydrogen sulfide and potassium bicarbonate. If necessary, hydrogen sulfide is oxidized into sulfur in a Claus furnace 12. Although air is favorably used as an oxidizer in this oxidation, it is also possible to utilize a part of sulfur dioxide produced from the above-mentioned thermal decomposition. The $CO_2$ gas used in the process can be obtained in various ways such as: (1) recovering the $CO_2$ gas generated when $KHCO_3$ is dissolved in the absorbing solution, (2) reusing the Claus tail gas by refining it, and (3) recovering $CO_2$ from the desulfurized and denitrated exhaust gas. After hydrogen sulfide dissipation, the remaining potassium bicarbonate is returned to the absorption step, but since a small quantity of potassium thiosulfate is inevitably produced as a by-product in the reduction of $K_2SO_4$, such potassium thiosulfate accumulates in the absorbing solution if said aqueous solution is returned immediately to the absorption step. In order to avoid this, the aqueous solution is sent to a crystallization tank 13 and cooled to 30° to 35° C. to crystallize potassium bicarbonate and the crystals are separated in a filtering separator 14 and then the crystals are returned to the absorption step for maintaining the concentration of $K_2SO_3$ constant in the absorbing solution. On the other hand, the filtrate is sent to the potassium sulfide and potassium carbonate dissolving tank 9 and used for dissolving these materials, with a part of the filtrate being further sent into the thermal decomposition furnace 8 for decomposing potassium thiosulfate to prevent its accumulation.

By means of these operations, both NOx and SOx contained in exhaust gas can be effectively converted into nitrogen gas and hydrogen sulfide or sulfur, respectively, and also the potassium sulfite consumed in the absorption tower 3 can be maintained at a constant level only by supply from the source within the system with no need of supplying any other chemicals from the outside. Further, the loss of the chelating agent in the absorbing solution is confined to the minimum.

The invention is now described in further detail by way of the following non-restrictive examples:

EXAMPLE 1:

A gas of the following composition and an absorbing solution of the following composition were supplied at the rates of 150 Nm$^3$/h and 1.7 t/h, respectively, into a packed-type absorption tower of 150 mm square and 8 m in height. As a result, the absorption rates of $SO_2$ and NO during the period from 5th to 100th hour after start of the operation were 98% and 81%, respectively.

| Composition of the gas: | |
|---|---|
| $SO_2$ | 2,600 ppm |
| NO | 180 ppm |
| $O_2$ | 4% |
| $N_2$ | Remainder |
| Temperature | 70° C. |
| Composition of the absorbing solution: (other than water) | |
| Fe-EDTA | 0.225 mol/kg |
| $K_2SO_3$ | 0.95 mol/kg |
| pH | 6.5 (adjusted by adding $K_2CO_3$) |
| Temperature | 55° C. |
| Amount of solution in absorption tank | 250 kg |

During the course of gas absorption, a part of the absorbing solution was drawn out at the rate of 75 kg/h and cooled down to 35° C. and then the precipitated potassium salt was separated and washed well with cold water. An amount of potassium carbonate was added to the mixture of the filtrate and the washing, and the combined solution was returned to the absorbing solution tank for recycling. The separated crystals amounted to 198 kg after 100-hour operation. These crystals were a mixture of 146 kg of $K_2S_2O_6$, 23 kg of $NH(SO_3K)_2$ and 29 kg of $K_2SO_4$. An analysis of EDTA in the absorbing solution by means of back titration of Ca after 100-hour operation indicated the concentration of EDTA of 0.224 mol/kg.

REFERENTIAL EXAMPLE:

Absorption of $SO_2$ and NO was peformed for 100 hours by using the same absorption tower as used in Example 1 and by the same procedure as Example 1 except for the changes of the gas temperature to 130° C. and of the temperatures of absorbing solution to 55° C. and 65° C. It was found as a result of the analysis that EDTA in the absorbing solution after 100-hour operation has dropped from 0.225 to 0.198 mol/kg and to 0.211 mol/kg, respectively.

EXAMPLE 2:

A mixture of 50 moles of $K_2S_2O_6$, 7 moles of $NH(SO_3K)_2$ and 15 moles of $K_2SO_4$ was put into a heat-proof container after drying and then heated until the internal temperature reached 300° C. As a result, 50 moles of gaseous $SO_2$ was produced. When the mixture was further heated to 500° C., there were produced 2.2 moles of $N_2$ gas, 2.3 moles of $NH_3$ gas and 6.5 moles of $SO_2$ gas, and 72 moles of $K_2SO_4$ remained in the container. Then 4.6 kg of coal pulverized to the particle size of 50–100μ and having fixed carbon of 75% was mixed well with $K_2SO_4$ and heated externally to 950° C. under the atmospheric pressure for 20 minutes. The smelt which remained in the container showed the following composition:

| | |
|---|---|
| $K_2S$ | 80.8 mol % (based on $K_2SO_4$) |
| $K_2CO_3$ | 9.6 mol % |
| $K_2S_2O_3$ | 1.9 mol % |
| $K_2SO_3$ | 2.6 mol % |
| $K_2SO_4$ | 3.1 mol % |
| Water insolubles | a little |

EXAMPLE 3:

The smelt obtained in Example 2 was dissolved in water to form 20 kg of an aqueous solution. This solution was allowed to stand and the resultantly formed supernatant liquid green in color was supplied into a packed-type column of 100 mm in diameter and 2 m in height and $CO_2$ was passed at the rate of 1 $Nm^3/h$ for 4.5 hours while controlling the temperature at 80° C. There was consequently obtained 30 vol% of $H_2S$. The solution removed from this tower had the following composition:

| | |
|---|---|
| $KHCO_3$ | 42% by weight (partly slurried) |
| KHS | 6.9% by weight |
| $K_2S_2O_3$ | 2.0% by weight |

6 kg of $KHCO_3$ could be separated by cooling said solution to 20° C.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

What is claimed is:

1. In a method of treating an exhaust gas at a high temperature containing nitrogen oxides and sulfur oxides by bringing the exhaust gas into contact with an absorbing solution containing at least an iron chelate salt and potassium sulfite to thereby convert said nitrogen oxides and sulfur oxides into a salt mixture of potassium imidodisulfonate, potassium dithionate and potassium sulfate, the improvement comprising the following steps:

said exhaust gas at a high temperature is cooled to a temperature below 80° C. before bringing it into contact with the absorbing solution;

the concentration of potassium sulfite as the sulfite component in said absorbing solution is kept at least at 0.8 mol/kg; and said salt mixture produced in said absorbing solution is crystallized by cooling and separated by filtering said absorbing solution.

2. A method according to claim 1, wherein said absorbing solution is maintained at a temperature within the range of 40° to 60° C.

3. A method of treating an exhaust gas comprising the steps of: (a) cooling said exhaust gas at a high temperature containing nitrogen oxides and sulfur oxides to a temperature below 80° C; (b) bringing said exhaust gas into contact with an absorbing solution containing at least an iron chelate salt and potassium sulfite at a concentration higher than 0.8 mol/kg to absorb said nitrogen oxides and sulfur oxides into said solution; (c) cooling and filtering said absorbing solution containing the absorption products consisting of potassium imidodisulfonate, potassium dithionate and potassium sulfate, so as to crystallize and separate said potassium imidodisulfonate, potassium dithionate and potassium sulfate and circulating the filtrate back into the absorbing step; (d) thermally decomposing and reducing said separated crystalline components into nitrogen, sulfur dioxide and potassium sulfide; (e) making an aqueous solution of said potassium sulfide and blowing gaseous carbon dioxide thereinto to convert said potassium sulfide into hydrogen sulfide and potassium bicarbonate; and (f) supplying a part of sulfur dioxide and potassium bicarbonate obtained in said steps (d) and (e), into the step (b) for maintaining the concentration of potassium sulfite in the absorbing solution in the step (b) at a predetermined constant level.

4. A method according to claim 3, wherein said absorbing solution is maintained at a temperature within the range of 40° to 60° C.

* * * * *